Figure 1:
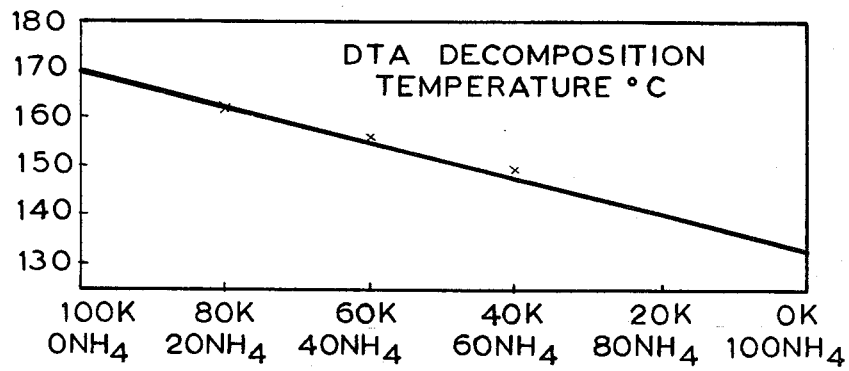

INVENTORS
John Philip Leaver
BY Michael Thor Pope
Albert H. Jacklin
ATTORNEY

3,227,517
POTASSIUM-AMMONIUM PERMONOSULPHATE COMPOUNDS AND METHOD OF THEIR PREPARATION
John Philip Leaver, Harpenden, and Michael Thor Pope, Toddington Dunstable, England, assignors to Laporte Chemicals Limited, Luton, England, a British company
Filed Aug. 21, 1961, Ser. No. 132,707
Claims priority, application Great Britain, Aug. 23, 1960, 29,152/60
11 Claims. (Cl. 23—50)

This invention relates to permonosulphates and to a process for the preparation thereof. The invention is particularly concerned with novel compounds comprising the permonosulphate, the bisulphate, and the sulphate anions in the ratios specified below in combination with the potassium and ammonium cations in the ratios specified below and to processes for their production.

The preparation of permonosulphates has previously been described in the literature. Thus Mellor in "A Comprehensive Treatise on Inorganic and Theoretical Chemistry" vol. X pp. 482 to 485 (1930) describes some of the known methods. Experimental production of permonosulphates by processes outlined in this treatise yielded (a) a product containing 21% $KHSO_5$, corresponding to 2.3% active oxygen, one half of which was lost on storage within 8 days; (b) a solution containing 2.5% sodiumpermonosulphate, which lost all active oxygen on drying; (c) a powder which contained no active oxygen and hence no permonosulphate. Since active oxygen is a measure of the usefulness of the material as an oxidising agent, a low active oxygen content is undesirable.

The loss of active oxygen on storage ("active oxygen") being a term well understood in the art and quantified in relation to the sample under discussion as follows:

Percent active oxygen =

$$\frac{\text{Wt. of } \boxed{O} \times 100}{\text{Wt. of (Na, K, NH}_4\text{)HSO}_5 + \text{Wt. of any insert substance in the sample.}}$$

where $\boxed{O}$ represents the oxygen liberated by the decomposition $(Na, K, NH_4)HSO_5 \rightarrow (Na, K, NH_4)HSO_4 + O$ can be a serious drawback to the use of permonosulphates in detergent preparations since these may often be stored for considerable periods before use. In addition, if the permonosulphate is hygroscopic it shows a tendency to agglomerate and this may entirely vitiate attempts to provide dry free-flowing detergent mixtures of the kind widely used at the present time for laundry and washing purposes.

Other requirements of a good bleaching agent in a detergent mixture are (a) good solubility in water since low solubility may result in localised fabric damage on addition of the detergent mixture to the wash (b) a density which does not differ substantially from that of the other materials of the spray dried detergent mixture; this obviates segregation, and (c) that it should be capable of being produced cheaply.

Thus the following are the desirable characteristics for a permonosulphate composition if its proposed use is to be as an ingredient in a detergent mixture:
 (a) acceptable oxygen content.
 (b) satisfactory low rate of loss of oxygen.
 (c) low tendency to absorb water from the atmosphere.
 (d) good solubility in water.
 (e) acceptable density.
 (f) capable of being produced cheaply.

An attempt has been made to meet these criteria by the supply of compositions approximating to the empirical formula $2KHSO_5 KHSO_4 : K_2SO_4$, but the use of alkalis based upon the potassium cation results, however, in a relatively high-cost product.

Our investigations of the use of alkalis based upon the sodium and ammonium cations, such alkalis being cheaper than those based upon the potassium cation however, show (i) that a salt of the empirical formula $$2NaHSO_5 \cdot NaHSO_4 \cdot (Na)_2SO_4$$

cannot be made and (ii) that a salt of the empirical formula $2(NH_4)HSO_5 \cdot (NH_4)HSO_4(NH_4)_2SO_4$ is really unsuitable since it tends to be relatively highly hygroscopic. Despite these unfavourable results using alkalis based upon the sodium and ammonium cations, we investigated the use of mixtures of alkalis; namely, mixtures of those based on (a) sodium and ammonium, (b) sodium and potassium, and (c) potassium and ammonium ions have been used. In the case of mixtures (a) and (b) the results were equally discouraging. However the results using certain mixtures of alkalis based on potassium and ammonium unexpectedly gave a compound which substantially met the above-mentioned desirata. Thus, using mixtures where the ratio of $K:NH_4$ was in the range 1:1 to 9:1 a suitable product was obtained.

Accordingly the present invention provides a novel composition comprising a salt having permonosulphate, hydrogen sulphate, and sulphate-anions and potassium and ammonium cations, the $HSO_5^-/HSO_4^-/SO_4^{--}$ ratio being 2:1:1 and the $K/NH_4$ ratio lying between 1:1 and 9:1.

The formulae covering these salts are

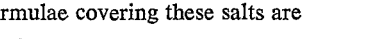

$$K_x(NH_4)_{5-x}(HSO_5)_2 \cdot (HSO_4) \cdot (SO_4)$$

where $x$ has a value between 2.5 and 4.5

Desirably $x$ has a value between 3.0 and 4.5; that is to say desirably the $K/NH_4$ ratio lies between 3:2 and 9:1.

Preferably $x$ has a value between 3.5 and 4.0; that is to say preferably the $K/NH_4$ ratio lies between 7:3 and 4:1.

As described below, various methods have been employed to obtain the product in question (i.e. where

$$HSO_5^-/HSO_4^-/SO_4^{--}$$

is 2:1:1 and the $K/NH_4$ ratio lies between 1:1 and 9:1).

It will be seen that these ammonium/potassium salts have particular properties but firstly it is proposed to discuss the evidence for the existence of these compounds. This evidence rests upon X-ray and differential thermal analysis.

The X-ray analysis was carried out with a 9 cm. Unicam instrument using Cu Kα radiation. The unit cell of the triple salt is orthorhombic with the $d$ values given in Table A below A. units. $d$ Values from X-ray powder diffraction photographs are given for the plain potassium and the plain ammonium salts and two compounds according to the present invention. As the unit cell contains 4 molecules, or 20 cations, there is no reason to suppose that in the two compounds according to the present invention a particular cation is associated with a given anion. The nine values given are the nine strongest lines appearing on the X-ray photographs and these lines are taken as characterizing the compounds analysed.

TABLE A

In each of the columns 2 to 4 the anion was the same as in column 1, viz. $(HSO_5)_2 \cdot (HSO_4) \cdot SO_4$.

| $K_5(HSO_5)_2(HSO_4)SO_4$ | $K_4(NH_4)$ .. | $K_3(NH_4)_2$ .. | $(NH_4)_5$ |
|---|---|---|---|
| 3.89 | 3.94 | 3.96 | 4.05 |
| 3.50 | 3.54 | 3.53 | 3.63 |
| 3.31 | 3.34 | 3.35 | 3.39 |
| 3.16 | 3.17 | 3.19 | Not observed |
| 3.03 | 3.04 | 3.06 | Band 3.12–3.05 |
| 2.91 | 2.95 | 2.96 | |
| 2.28 | 2.83 | 2.83 | 2.96 |
| 2.57 | 2.57 | 2.58 | 2.63 |
| 2.44 | 2.48 | 2.49 | 2.50 |

The evidence based on differential thermal analysis is given in FIGURE 1 of the accompanying drawing. Analyses were carried out by heating 0.3 g. of sample alongside 0.3 g. inert material ($\gamma Al_2O_3$) at 10° C./minute from 20 to 200° C. Temperature differences were measured between the test and inert samples. The temperature of the inert sample corresponding to maximum rate of heat evolution is taken as the decomposition temperature. The decomposition temperature for the $(NH_4)+$ salt was 133° C. compared with 168° C. for the potassium salt.

The full figures are given in Table B.

TABLE B

| Composition | Decomposition Temperature |
|---|---|
| $(NH_4)_5[(HSO_5)_2 \cdot HSO_4 SO_4]$ | 133 |
| $(NH_4)_3K_2[(HSO_5)_2 \cdot HSO_4 SO_4]$ | 150 |
| $(NH_4)_2K_3[(HSO_5)_2 \cdot HSO_4 SO_4]$ | 155 |
| $(NH_4)K_4[(HSO_5)_2 \cdot HSO_4 SO_4]$ | 163 |
| $K_5[(HSO_5)_2 \cdot HSO_4 SO_4]$ | 168 |

Figure 2:
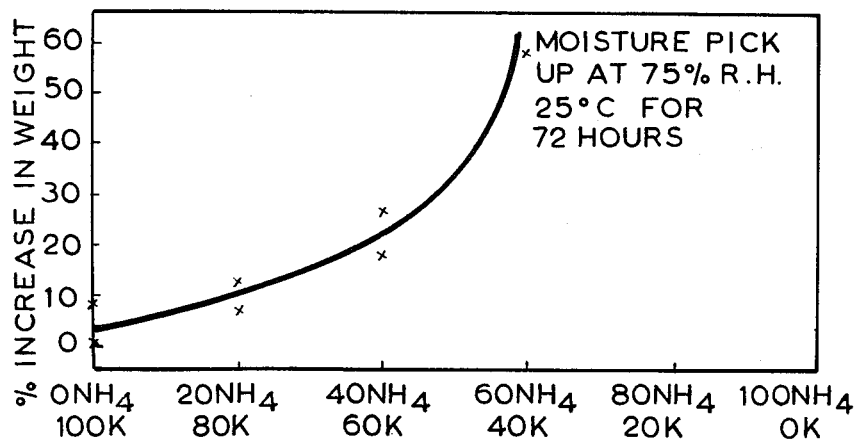
Figure 3:
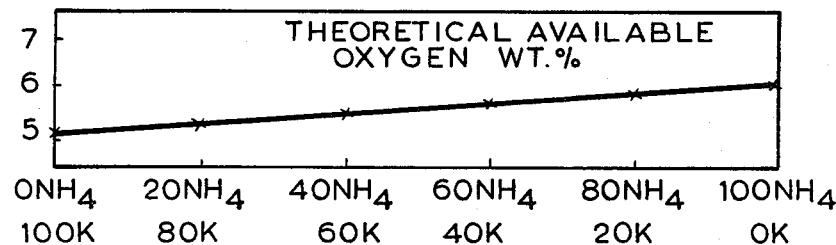
Figure 4:
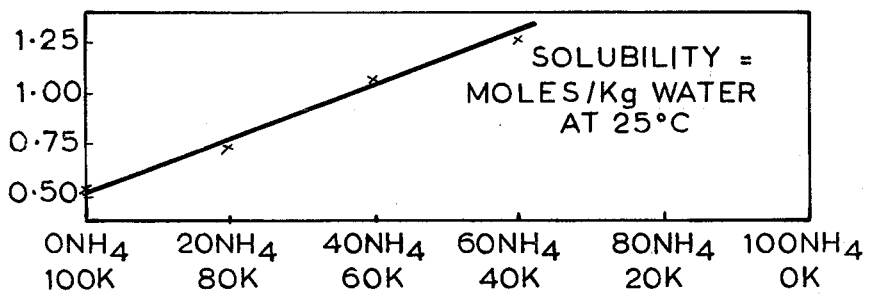
Figure 5:
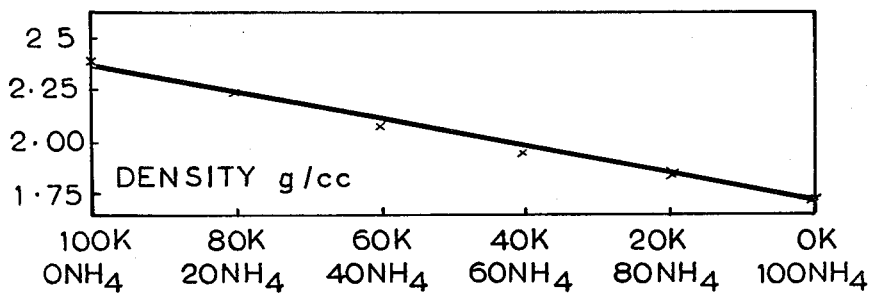
Figure 6:
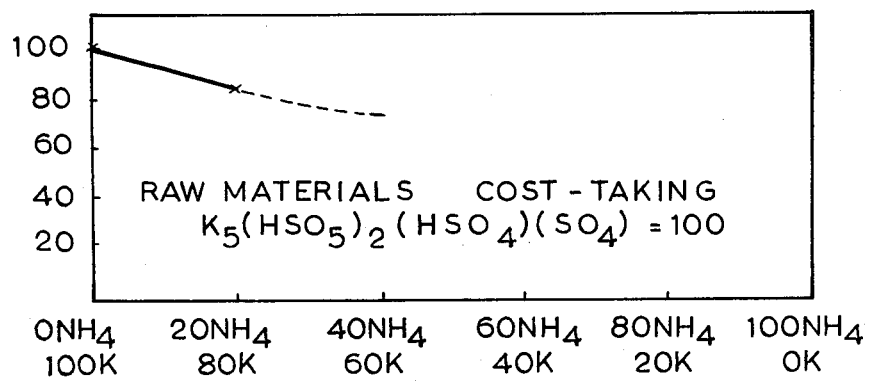

The remaining figures (FIGS. 2 to 6 inclusive) compare other properties of the different salts. These graphs show that the chosen range of the salts (i.e. those with an ammonium cation (content) of from 10 to 50% have an acceptably low tendency to absorb water from the atmosphere (FIG. 2), have a better theoretical available oxygen content than the potassium salt (FIG. 3), have a better solubility (FIG. 4), a lower density (FIG. 5) and this is desirable because the normal ingredients of a spray dried detergent mix have densities lower than those of the salts, and are cheaper in raw materials (FIG. 6). From FIG. 6 it will be seen that the greater the ammonium content the greater the saving; it is added that employment of ammonium does not increase processing costs.

A variety of methods of manufacturing these salts is available, always provided that the final result is an $HSO_5^-/HSO_4^-/SO_4^{--}$ ratio of 2:1:1 and a $K/NH_4$ ratio lying between 1:1 and 9:1. Thus permonosulphuric acid may be prepared by the reaction of oleum with high strength hydrogen peroxide followed by partial neutralisation with a potassium or ammonium based alkali. To the product are then added appropriate quantities of the sulphate and bisulphate of ammonium or potassium to give a final product of the specified anions and cations. Alternatively, a mixture of alkalis may be used.

Alternatively, the pyrosulphate prepared for example by reacting potassium sulphate with liquid sulphur trioxide, is reacted with high strength hydrogen peroxide e.g. 85% by weight or higher to give a mixture of the permonosulphate and bisulphate. If sufficient excess of potassium sulphate is employed as to give the desired sulphate content of the final product then all that need be added after the peroxide reaction is an amount of a suitable ammonium based alkali.

Alternatively, pure materials may be added together either in solution or as solids to be made up into a paste, the quantities of anions and cations being added together being adjusted to give a product of the desired formula.

As a variation, the addition of bisulphate may be substituted by the addition of sulphate and the appropriate quantity of sulphuric acid.

If desired, permonosulphuric acid may be added to the alkali. Thus, the pH of the solution containing the reactants may drop from a high alkaline value to the desired value, which will be on the acid side of neutral. Desirably, if this course is followed, neutralisation is effected rapidly, i.e. in a period of the order of not more than twenty minutes.

A further variant comprises passing potassium permonosulphate down a column of a strong acid cation exchange resin in the ammonium form and adding the appropriate hydrogen sulphate to the product.

Alternatively sulphate may be added to the acid, and, while some alkali for example carbonate and hydroxide is still required, localised heating is reduced if the carbonate is added with the sulphate or after it. Thus any necessary cooling is reduced, thus lessening refrigeration costs.

It follows from the above that many variations are possible. Thus, while one cation in combination with a particular anion has been specifically mentioned as being added to or reacted with another compound comprising another cation in combination with a further anion, provided that the anionic ratios and the cationic ratios of the product are as desired, the way in which cations and anions are combined before reaction can obviously be varied.

Permonosulphate compositions provided by the invention may be obtained in a dry free-flowing state with an active oxygen content of 5% or more A boron compound may be used as an extender and solutions of these compositions may be dried in the presence of such an extender, the quantity of which is at least 1% and preferably at least 2% by weight based on the weight of the solid. Preferred boron compounds for this purpose are boric oxide, boric acid and the alkali metal borates and perborates. It is preferable to employ the extender in an amount not exceeding 12% of the weight of the solid.

The compositions produced may also have other extenders added to them and this will particularly be the case when the final product is desired as a bleaching composition. Thus, alkali metal carbonates, sesquicarbonates, phosphates, sulphates, and silicates may be added to the product or any mixture of these.

The following examples illustrate processes in accordance with the present invention:

Example 1

327 parts of 65% oleum were added slowly while stirring to 137 parts of 86% by weight hydrogen peroxide maintained below 5° C. The product contained 78.7% $H_2SO_5$, 2.1% $H_2O_2$ and 3.1% $H_2S_2O_8$. A solution of 35% potassium carbonate was added with stirring to this acid (maintained at 0 to 5° C.) until the pH was 1.5. The reaction mixture was concentrated under vacuum at 50° C. until a wet solid was obtained.

Sufficient ammonium sulphate and bisulphate was added to the mixture, so that the mole ratio of the anions $HSO_5':HSO_4':SO_4''$ became 2:1:1. After thorough mixing the product was heated in an air current at 50° C. for 24 hours. Differential thermal analysis showed a compound of the type in question but no free permonosulphate, and the content of ammonium cations in mole percent of total cation content was 48. The active oxygen content of the product was 5.6%.

Example 2

A portion of the acid prepared as described in Example 1 was diluted with water to 70% permonosulphuric acid and was added with stirring to 35% potassium carbonate maintained at 0 to 5° C. until a pH value of 3.5 was reached. This method of neutralisation required about twenty minutes and conversion of permonosulphuric acid to permonosulphate was about 87%. The reaction mixture was then treated as described in Example 1, with the same result, except that the content of ammonium cations was 30 mole percent and the active oxygen was 5.4%.

*Example 3*

100 parts of dried $K_2SO_4$ were reacted under 500 parts dry carbon tetrachloride, with 45 parts of liquid sulphur trioxide and then with 28 parts of 95% $H_2O_2$, not allowing the temperature to rise above 40° C. The reactions were carried out in a dry atmosphere. The product filtered from the diluent solvent contained 66 parts $KHSO_5$, 64 parts $KHSO_4$ and 21 parts $K_2SO_4$. This was mixed with 7 parts of ammonium carbonate and 3 parts of water to form a smooth paste (after effervescence). The paste was dried under vacuum at 50° C. for 48 hours. The product contained 90% of a salt of the type in question containing about 15 mole percent of its cations as ammonium. The active oxygen content of the product was 4.8%.

*Example 4*

A solution was made up of 100 parts of potassium permonosulphate monohydrate, 50 parts of potassium sulphate, 19 parts of ammonium sulphate and 14 parts of 98% sulphuric acid in 700 parts of water. This was evaporated to dryness under vacuum at 50° C. The residue when ground was a free flowing powder containing 4.95% active oxygen. X-ray and D.T.A. examination showed that 95% of the permonosulphate was in the form of a compound of the type in question.

*Example 5*

100 parts of anhydrous potassium permonosulphate were mixed with 45 parts $KHSO_4$, 43 parts $(NH_4)_2SO_4$ and 33 parts of water to form a smooth paste. The paste was dried in an air current at 50° C. for 24 hours. The product after grinding was a free flowing powder which contained 5.5% available oxygen. X-ray and D.T.A. examination showed that 95% of the permonosulphate present was in the form of the triple salt.

*Example 6*

A solution of 100 parts of $KHSO_5$, 33 parts $H_2SO_4$, 24 parts $(NH_4)_2SO_4$ and 20 parts of $K_2SO_4$ in approximately 120 parts water was crystallised slowly at 0° C. The resulting crystals contained 4.87% available oxygen as permonosulphate and 1.86 m. eq. acid per gm. The molar proportion of cations as ammonium was 10% and D.T.A. showed that the permonosulphates were in the form of a compound of the type in question. The active oxygen content of the product was 5.3%.

What we claim is:

1. Permonosulphate compounds having the general formula $K_x(NH_4)_{5-x}(HSO_5)_2 \cdot (HSO_4) \cdot (SO_4)$, wherein $x$ has a value between 2.5 and 4.5.

2. Permonosulphate compounds according to claim 1, wherein $x$ has a value of between 3 and 4.5.

3. Permonosulphate compounds according to claim 1, wherein $x$ has a value of between 3.5 and 4.0.

4. A process for the preparation of permonosulphate compounds having the general formula $$K_x(NH_4)_{5-x}(HSO_5)_2 \cdot (HSO_4) \cdot (SO_4)$$

wherein $x$ has a value between 2.5 and 4.5, comprising the steps of reacting together in the presence of water, components containing potassium and ammonium cations in a ratio from 1:1 to 9:1, and permonosulphate, bisulphate and sulphate anions in a ratio of substantially 2:1:1 and isolating the desired permonosulphate compound.

5. A process according to claim 4 wherein the potassium component is permonosulphate.

6. A process according to claim 4 wherein the ratio of potassium and ammonium cation is from 3:2 to 9:1.

7. A process for the preparation of permonosulphate compounds having the general formula $$K_x(NH_4)_{5-x}(HSO_5)_2 \cdot (HSO_4) \cdot (SO_4)$$

in which formula $x$ has a value between 2.5 and 4.5 comprising reacting together in the presence of water, components providing potassium and ammonium cations in the ratio of from 1:1 to 9:1 and permonosulphate, bisulphate and sulphate anions in the ratio of substantially 2:1:1, said components including at least one member selected from the group consisting of ammonium sulphate and ammonium bisulphate and isolating the desired permonosulphate compound.

8. A composition comprising at least one permonosulphate of the formula $$K_x(NH_4)_{5-x}(HSO_5)_2 \cdot (HSO_4) \cdot (SO_4)$$

in which formula $x$ has a value between 2.5 and 4.5 and at least one extender capable of improving the flowing properties of the permonosulphate.

9. A composition according to claim 8 wherein the extender is selected from the group consisting of boron oxide, boric acid, alkali metal borates and alkali metal perborates.

10. A composition according to claim 8 comprising in addition to least one additive selected from the group consisting of alkali metal carbonates, alkali metal sesquicarbonates, alkali metal phosphates, alkali metal sulphates and alkali metal silicates.

11. A process according to claim 4 wherein the ratio of potassium and ammonium cation is from 7:3 to 4:1.

References Cited by the Examiner

UNITED STATES PATENTS

| | | | |
|---|---|---|---|
| 2,311,314 | 2/1943 | Reichert et al. | 252—175 X |
| 2,802,722 | 8/1957 | Stephanou | 23—114 |
| 2,886,412 | 5/1959 | Lake et al. | 23—114 |
| 2,886,534 | 5/1959 | Lake et al. | 252—186 |
| 2,901,318 | 8/1959 | D'Addieco | 23—114 |
| 2,927,082 | 3/1960 | Young | 252—186 |
| 2,932,556 | 4/1960 | Stephanou | 23—114 |
| 2,996,350 | 8/1961 | Taylor | 252—186 X |
| 3,002,813 | 10/1961 | Darbee et al. | 23—114 |
| 3,042,488 | 7/1962 | Hildon et al. | 23—114 |

FOREIGN PATENTS 727,419  3/1955  Great Britain.

MAURICE A. BRINDISI, *Primary Examiner.*

JULIUS GREENWALD, *Examiner.*